Nov. 9, 1971  R. T. CONVEY, JR., ET AL  3,618,260
WEED-INHIBITING AND WATERING ATTACHMENT DEVICE FOR POTTED PLANTS
Filed April 2, 1970  2 Sheets-Sheet 1

INVENTOR.
ROBERT T. CONVEY, JR.
BY
Ernest H. Schmidt
ATTORNEY.

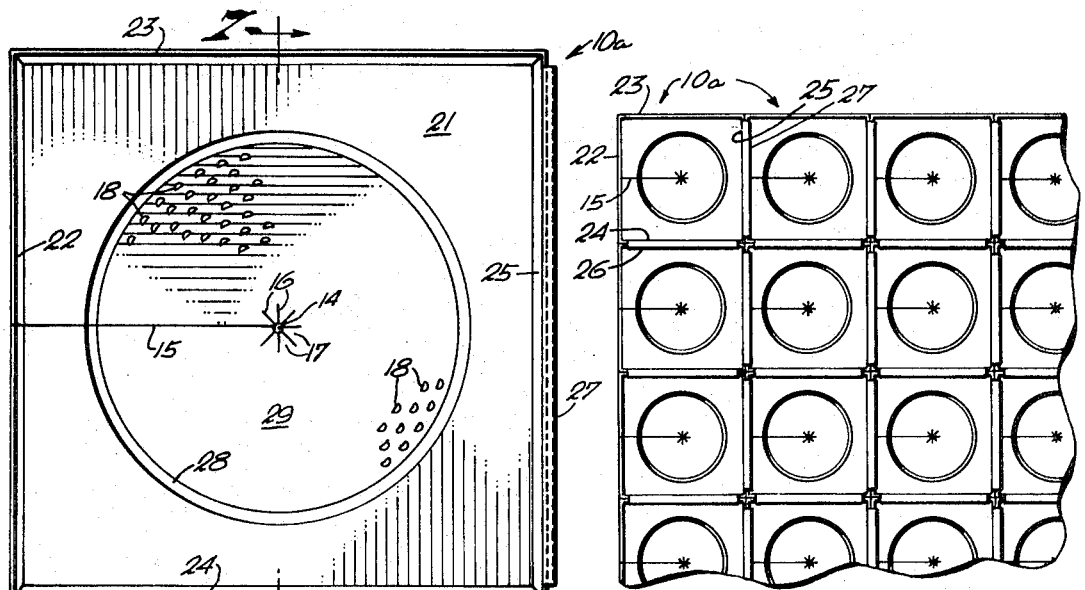
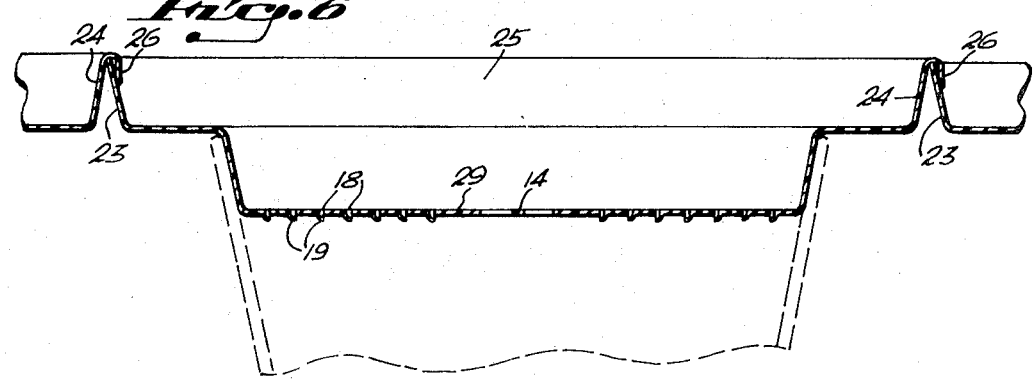
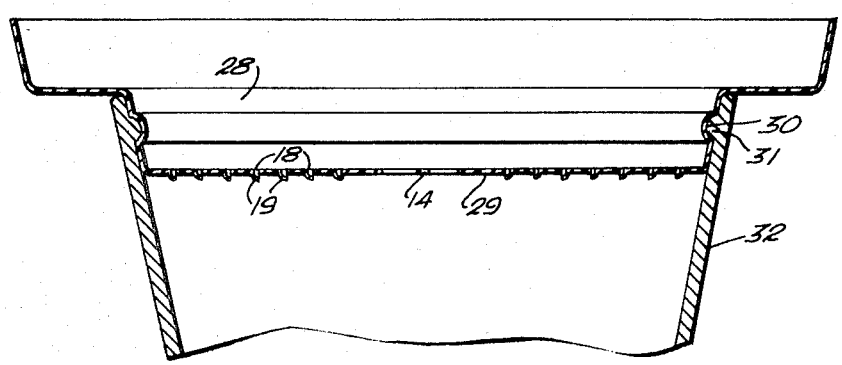

3,618,260
**WEED-INHIBITING AND WATERING ATTACH-
MENT DEVICE FOR POTTED PLANTS**
Robert T. Convey, Jr., 1030 Andora Ave.,
Coral Gables, Fla. 33146
Filed Apr. 2, 1970, Ser. No. 25,049
Int. Cl. A01g 9/02
U.S. Cl. 47—32                             10 Claims

ABSTRACT OF THE DISCLOSURE

A substantially rigid, thin, plate-like device having a central opening for passage of a plant stem and having a short frusto-conical center portion adapted to be friction-fitted within the upper end of the pot for attaching the device in place, is described. The bottom of the frusto-conical portion, in addition to the central plant stem opening, is provided with a plurality of sidewardly-extending openings permitting the flow of water therethrough while at the same time minimizing the possibility of weed growth. The frusto-conical center portion merges into a peripheral extension portion operative to collect rain and or sprinkler water for moistening the pot soil.

---

It is the principal object of this invention to provide a weed inhibiting and watering attachment device for potted plants that can readily be attached to standard size plant containers or pots for inhibiting weed growth, while at the same time serving to collect and feed into the pot or container soil, along with rain and sprinkler water falling directly upon the container, additional amounts collected from a peripheral area surrounding the container.

It is a more particular object of the invention to provide an attachment device of the character described which can readily be manufactured of a tough, impervious material such as a vacuum-molded synthetic plastic for economical use in large quantities by commercial nurseries dealing in potted or containerized plants, thereby substantially reducing the work involved in weeding and watering the plants to reduce production costs.

It is another object of this invention to provide an attachment device for potted plants or containers which can quickly be attached to a container having a growing plant by tight friction-fit within the upper end of the container, so as to remain in place even when subjected to strong winds and heavy rains.

Still another object of the invention is to provide an attachment device of the above nature which will readily nest or inter-fit with a plurality of like devices for compact storage and transportation.

Yet another object of the invention is to provide an attachment device for potted or containerized plants which will be square or rectangular in peripheral shape and which includes hook means for interlocking with like, adjacently-placed attachment devices, wherby in regularly-arranged groups of potted plants fitted with the inter-hooked devices, the security of attachment will be substantially enhanced to better resist accidential detachment under unusual adverse conditions of wind and rain such as might occur, for example, during thunderstorms.

Other objects, features and advantages of the invention will be apparent from the following description when read with reference to the accompanying drawings. In the drawings, wherein like reference numerals denote corresponding parts throughout the several views:

FIG. 6 is a top view of a modified form of weed inhibiting and watering device for potted plants;

FIG. 7 is a transverse cross-sectional view taken along the line 7—7 of FIG. 6 in the direction of the arrows;

Figure 2:
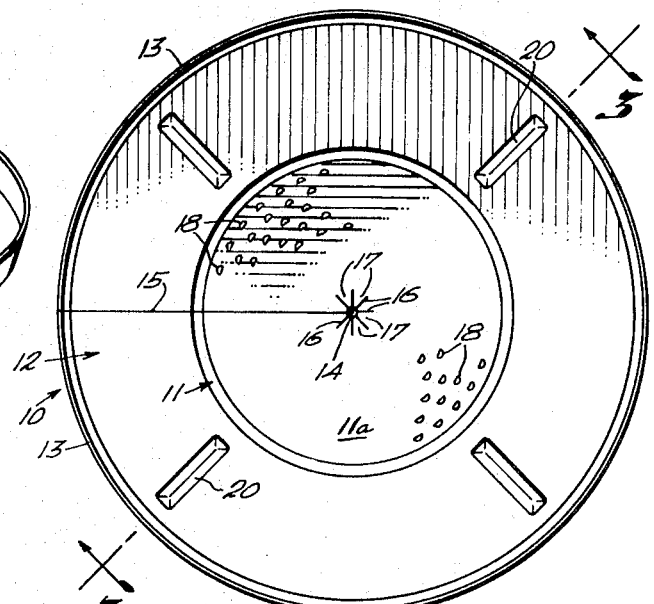
FIG. 2 is a top view of the attachment device, shown separately.

FIG. 8 illustrates how a plurality of devices as shown in FIGS. 6 and 7 can be interengaged in a regular formation of potted plants to which they are attached to minimize the possibility of their inadvertent displacement by high winds or heavy rains, for example; and FIG. 9 illustrates a modification of either of the embodiments illustrated in FIGS. 2 and 6 providing for interlocking engagement with a plant container having an interiorly-beated rim.

Referring now in detail to the drawings and considering first the embodiment of the invention illustrated in FIGS. 1 through 5, reference numeral 10 designates, generally, one form of weed inhibiting and watering attachment device for potted plants. The device 10 is preferably integrally formed of a tough, impervious material, preferably a synthetic plastic, and may be vacuum-molded into a thin, light-weight, semi-rigid structure. The attachment device 10 is circular in form and comprises a shallow, frusto-conical, concentric center portion 11 the upper edge of which merges with an outwardly and slightly upwardly-inclined, annular extension portion 12 the outer periphery of which terminates in a short, upwardly-extending and slightly outwardly-inclined rim portion 13. The integral bottom 11a of the frusto-conical center portion 11 is provided with a small, circular central opening 14 extending into which is a radially-extending through 15. A plurality of uniformly-distributed, short radial slits 16 extend into the central opening 14 to define with one another and with the through radial slit 15, a plurality of resilient, triangular tongues 17.

The bottom 11a is provided with a plurality of small openings 18, preferably in a regular pattern covering substantially all of said bottom area, for the through passage of water. Preferably, the openings 18 are provided by striking downwardly or otherwise deforming portions 19 of the bottom wall surface along small cuts or slits so that said openings do not extend vertically, but rather sidewardly of the upper surface of said bottom wall. Such construction, while providing for free flow of water through the center portion 11a and into the plant container or pot to which it is attached, minimizes the possibility of weeds taking root and growing through said openings.

Figure 1:
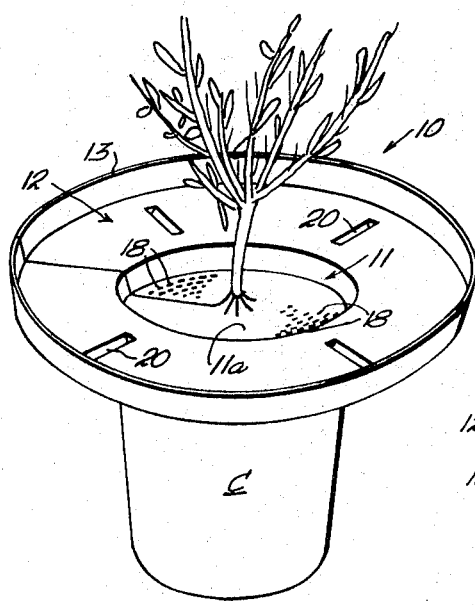
FIG. 1 is an oblique view, as seen from above, of a weed inhibiting and watering attachment device embodying the invention, shown attached to a container holding a small plant.
Figure 3:
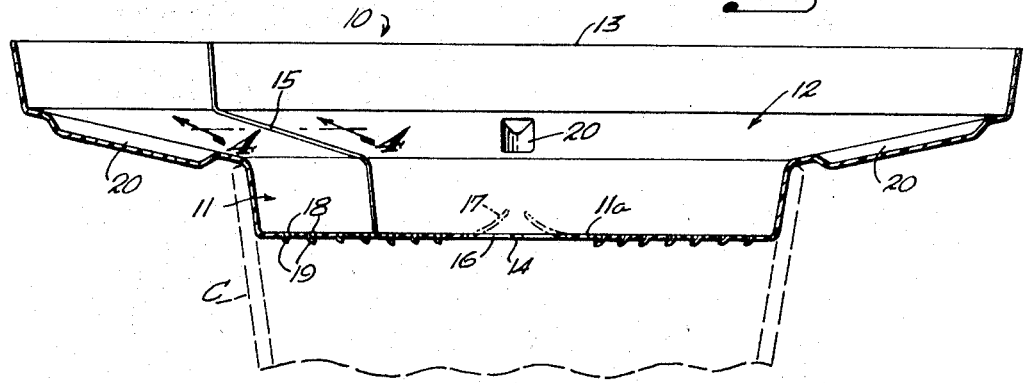
FIG. 3 is a transverse, cross-sectional view taken along the line 3—3 of FIG. 2 in the direction of the arrows, on an enlarged scale.
Figure 4:
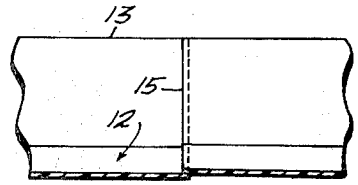
FIG. 4 is a fragmentary, cross-sectional view taken along the line 4—4 of FIG. 3 in the direction of the arrows.
Figure 5:
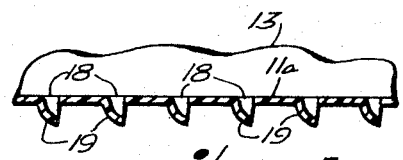
FIG. 5 is a vertical, partial cross-sectional view of the perforated portion of the device, illustrating details of construction.

As illustrated in FIGS. 1, 2 and 3, for strengthening purposes the annular extension portion 12 of the device is provided with a plurality of radial-extending, formed-in-place depressions 20 serving as stiffening ribs.

In use, the weed inhibiting and watering attachment device will be applied to a potted plant (see FIG. 1) by flexing the device so as to separate it along the radial slit 15, whereupon it can be passed around the stem of the contained plant and inserted in place within the top opening of the container. As illustrated in FIG. 3, the peripheral wall taper of the central portion 11 of the device is substantially the same as that of the interior of the container at the upper end thereof to permit ready insertion. Also, the outer diameter of said central portion will preferably be slightly greater than that of the inner diameter at the upper end of the container to necessitate slight compression of the central portion and consequent slight overlap at the edges of the radial slit 15 when the device is seated fully in place (see FIG. 4). Such overlap not only insures that no open space along the slit will remain to permit the through growth of weeds, but also provides for increased compressional force at the mating surfaces between the device and the container for enhanced frictional grip and securement.

Referring to FIGS. 1 and 3, it can be seen how the resilient triangular tongues 17 will resiliently bend upwardly against the stem of the associated container plant to permit growth while at the same time minimizing open space through which weeds taking root at the base of the plant could grow. The upwardly-inclined and outwardly-extending annular extension portion 12 of the device serves to collect added amounts of rain or sprinkler water for keeping the plant soil moist.

It will be noted that the tapered surfaces of the annular extension portion 12 and the upwardly-extending rim portion 13 of the device permit stacking together in internesting relation of a plurality of the devices for compact storage or shipment.

Referring now to FIGS. 6 through 8 of the drawings, there is illustrated therein a modified form 10a of the invention, differing from the embodiment illustrated in FIGS. 1 through 5, described above, only in that a square extension portion 21 extends from the conical central portion 11 instead of the annular extension portion 12. The square extension portion 21 may be so formed as to be substantially flat, as illustrated in FIG. 7, or, alternatively, could be provided with a slight upwardly and outwardly-extending taper to more readily drain water into the conical central portion 11. The outer edges of the square extension portion 21 merged into a first adjacent pair of upstanding rim portions 22, 23, anl a second pair of adjacent upstanding rim portions 24, 25, all of which rim portions are preferably slightly outwardly-inclined or tapered. As means for inter-locking a plurality of the devices together when they are assembled in a rectangular pattern of potted plants arranged in rows, as in commercial nurseries for example, the second adjacent pair of upstanding rim portions 24, 25, merge into short, reversely-bent, downwardly-extending, hook portions 26, 27, adapted to fit over and hookingly engage upstanding rim portions 22 or 23 of adjacent pairs of the devices arranged in such a pattern, as illustrated in FIG. 8. With reference to FIGS. 6 and 8 it will be noted that the hook portions extend laterally somewhat short of their associated upstanding rim portions 24, 25 to prevent interference with hook portions of adjacent devices that are affixed in an interengagement pattern such as shown in FIG. 8. An important advantage of the interhooking arrangement of the devices in a regular pattern of potted plants resides in the fact that the devices will thereby be more securely held in place to resist upsetting or displacement by strong winds and heavy rains.

FIG. 9 illustrates still another modification of the invention whereby interengagement of the device within a plant container to which it is attached is still further enhanced. To this end the peripheral wall 28 of the central portion 29 of a weed inhibiting and water attachment device 10a, which may otherwise be similar in construction to either the device of FIG. 1 or the device of FIG. 6, is formed with an annular concavity 30, preferably arcuate in cross-sectional shape, of such size and so located as to snap-fit over a rounded annular bead 31 provided within the interior near the upper end of the associated container 32. It will be understood that in this form of an invention the container 32 will be fabricated for use with a particular cooperative attachment device, whereas the attachment device of FIGS. 1 and 6 will be applicable to standard plant pots or containers.

While I have illustrated and described herein only three forms in which my invention can conveniently be embodied in practice, it is to be understood that these forms are given by way of example only and not in a limiting sense. The invention, in brief, comprises all the embodiments coming within the scope and the spirit of the following claims.

What I claim as new and desire to secure by Letters Patent is:

1. A weed inhibiting and watering attachment device for potted plants comprising, in combination, a shallow frusto-conical central portion having an integral bottom wall at the lower end and a relatively large-diameter upper end, said upper end merging into an outwardly-extending peripheral extension portion the outer periphery of which is integrally formed with an upstanding rim, a small central opening in said bottom wall for through passage of the stem of a plant in the container to which the device is to be attached, and a radially-extending slit extending from said central opening and through said rim to permit flexing of the device therealong for the insertion of a plant stem upon attachment of the device to a pot or container in which the plant is growing, said bottom wall being provided with a plurality of openings for through flow of water.

2. A weed inhibiting and watering attachment device for potted plants as defined in claim 1 wherein said outwardly-extending peripheral portion is slightly upwardly as well as outwardly inclined to facilitate drainage of water into said frusto-conical central portion, and wherein said upstanding rim is slightly outwardly inclined to permit a plurality of the devices to be stacked in interfitting engagement.

3. A weed inhibiting and watering attachment device for potted plants as defined in claim 1 including a plurality of uniformly-distributed radial slits extending into said central opening, said bottom wall being of a thin, resilient material permitting upward flexing of the bottom wall portions defined by said slits to accommodate for increase in size of a plant stem extending through said central opening.

4. A weed inhibiting and watering attachment device for potted plants as defined in claim 3 wherein said bottom wall through openings are defined by short slits in said bottom wall and downwardly-struck wall portions along one side of each of said short slits to provide for sidewardly-extending communication with the underside of said bottom wall and thereby inhibit upward weed growth therethrough.

5. A weed inhibiting and watering attachment device for potted plants as defined in claim 4 wherein said outwardly-extending peripheral extension portion is circular about its outer periphery.

6. A weed inhibiting and watering attachment device for potted plants as defined in claim 1 wherein said outwardly-extending peripheral portion is rectangular about its outer periphery.

7. A weed inhibiting and watering attachment device for potted plants as defined in claim 6 including means along two adjacent edge portions of said upstanding rim for interengagement with two adjacent upstanding rim portions of a like device.

8. A weed inhibiting and watering attachment device for potted plants as defined in claim 7 wherein said interengagement means comprises reversely-bent, downwardly-extending hook portions integrally formed with and merging with one each of said first-mentioned adjacent rim portions.

9. A weed inhibiting and watering attachment device for potted plants as defined in claim 1 wherein said device is integrally formed of a tough resilient material, and wherein the outer periphery of said shallow frusto-conical central portion, at the inner end thereof, is slightly greater in diameter than the internal diameter at the upper end of a container to which the device is to be attached to enhance interfitting engagement by overlap along said through slit.

10. A weed inhibiting and watering attachment device for potted plants as defined in claim 1 wherein the center portion of the peripheral wall of said frusto-conical central portion is formed with an annular concavity of arcuate cross-sectional shape for interfitting engagement with a complemental annular bead provided within the interior near the upper end of a container to which the device is to be attached.

References Cited
UNITED STATES PATENTS

| | | | |
|---|---|---|---|
| 1,534,508 | 4/1925 | Earp-Thomas | 47—34 |
| 2,017,308 | 10/1935 | Elmer | 47—37 |
| 2,785,508 | 3/1957 | Coleman | 47—34 |
| 2,930,162 | 3/1960 | Mulford | 47—37 |
| 3,058,263 | 10/1962 | Reynolds | 47—34 |
| 3,147,569 | 9/1964 | Murguia | 47—37 |

ROBERT E. BAGWILL, Primary Examiner